United States Patent [19]

Rogers et al.

[11] Patent Number: 5,322,624
[45] Date of Patent: Jun. 21, 1994

[54] FUEL FILTER WITH DRAIN/FILL/SENSOR PORT

[75] Inventors: Jeffrey E. D. Rogers; Russell D. Ridgway; Wilhelm A. A. Perleberg, all of Kearney, Nebr.

[73] Assignee: Baldwin Filters, Inc., Kearney, Nebr.

[21] Appl. No.: 98,572

[22] Filed: Jul. 16, 1993

[51] Int. Cl.⁵ ............................................. B01D 35/00
[52] U.S. Cl. ..................................... 210/232; 210/248; 210/172; 210/436; 411/177; 411/369; 285/203
[58] Field of Search .................... 29/163.8, 456, 509, 29/513, 521; 411/176, 177, 369, 542; 285/202, 203, 205, 206, 222; 137/588; 210/232, 248, 348, 167, 168, 171, 172, 436, 472, DIG. 17

[56] References Cited

U.S. PATENT DOCUMENTS

| | | | |
|---|---|---|---|
| 1,456,883 | 5/1923 | Deeks | 210/312 |
| 2,533,266 | 12/1950 | Kovacs et al. | 210/DIG. 17 |
| 4,292,179 | 9/1981 | Stone et al. | 210/DIG. 17 |
| 4,440,193 | 4/1984 | Matheson | 137/558 |
| 4,543,182 | 9/1985 | Gramse et al. | 210/248 |
| 4,708,171 | 11/1987 | Cudaback | 137/588 |
| 4,740,299 | 4/1988 | Popoff et al. | 210/248 |
| 5,144,978 | 9/1992 | Brown et al. | 137/588 |

Primary Examiner—Peter A. Hruskoci
Assistant Examiner—Robert James Popovics
Attorney, Agent, or Firm—Leydig, Voit & Mayer

[57] ABSTRACT

A drain/fill/sensor port for use in fuel filters and a method for making the same. The port comprises a ferrule attached to a sheet metal shell which is formed with a domed end portion having a central aperture. The ferrule includes four angularly spaced slots adapted to receive and interlock with tabs spaced angularly around the aperture in order to fasten the ferrule securely to the shell.

5 Claims, 2 Drawing Sheets

FUEL FILTER WITH DRAIN/FILL/SENSOR PORT

FIELD OF THE INVENTION

The present invention relates generally to filters and more particularly to an improved drain/fill/sensor port for a fuel filter and to a method for making the same.

BACKGROUND OF THE INVENTION

Fuel filters such as fuel/water separators for internal combustion engines include a closed sheet metal vessel or shell which houses a filter element that is held and located within the shell by a coil spring. During typical operation, fuel flows through the filter element while water and heavier molecular particles are separated from the fuel and accumulate in a domed lower end portion of the shell. The water and other contaminants which accumulate as a result of the filtering process must be drained periodically from the shell. To this end, the domed end of the shell includes a port comprising a central aperture and a ferrule which is in the form of a metal ring with internal threads. A drain plug usually is threaded into the ferrule. Alternatively, a sensor with a selectively openable and closable drain valve may be threaded into the ferrule. The sensor is used to detect a variety of conditions within the filter.

In use, the filter is subjected to elevated pressures and thus the port must be designed to avoid leakage and to resist failure in a high pressure environment. Commercially available filters, which employ conventionally designed drain/fill/sensor ports, often experience severe performance limitations when repeatedly subjected to elevated pressures. Indeed, when subjected to testing, one presently commercially available filter housing burst at an average pressure of 230 psi and required replacement after only 53,000 test cycles.

The ports of conventional filters are often constructed by punching a hexagonal aperture through the center of the domed shell. A ferrule is then positioned within the aperture and is secured to the shell with an adhesive sealant such as Plastisol to complete the port. This design is less than optimal because the hexagonal central aperture, when subjected to high pressures, quickly develops fatigue cracking in its corners. In extreme cases, such fatigue cracking can eventually result in bursting since, during use, fuel is continually forced through the filter at high pressures and impose relatively high stress on the port.

Further, conventional port designs require two sealing points which often result in leakage problems in addition to the problems of bursting mentioned above. The first sealing point is disposed between the ferrule and the shell and is achieved by affixing the ferrule to the shell with the adhesive sealant. Such adhesives can eventually work loose, thereby opening gaps between the ferrule and the shell and often resulting in leakage. The second seal is typically an O-ring disposed between the ferrule and the drain plug or sensor. Since multiple seal arrangements create multiple paths for leakage, a filter incorporating such seals can develop leaks in a relatively short time.

OBJECTS OF THE INVENTION

The general object of the present invention is to provide an improved drain/fill/sensor port for use in fuel filters, the port increasing the service life of the filter by avoiding the structural weaknesses of conventional fuel filter port designs. A related object is to provide a port which is substantially leakproof and which can withstand the stresses inherent in filtering fuel under elevated and pulsating pressures associated with internal combustion engines.

Another object of the invention is to provide a port with only one seal point. It is a related object to provide a port which eliminates the need of a separate seal between the ferrule and shell and which does not require an adhesive to attach the ferrule to the shell.

It is yet another object of the present invention to provide a method for making an improved filter employing an improved drain/fill/sensor port which meets the above stated objectives.

SUMMARY OF THE INVENTION

The invention accomplishes these objectives and overcomes the drawbacks of the prior art by providing a specially constructed drain/fill/sensor port whose ferrule interacts directly with the filter shell. This construction avoids the need for a specialized seal between the ferrule and the shell thereby minimizing opportunities for leakage. Further, the unique manner in which the ferrule is affixed to the filter shell results in a strong port which is resistant to cracking and which can withstand the stresses associated with high pressure fuel filtering. Thus, the port of the present invention results in an improved fuel filter with an extended service life.

As previously mentioned, the ferrule of the drain/fill/sensor port is designed for direct attachment to the filter shell. To this end, the filter shell includes a central aperture in its domed portion, the aperture being formed with tabs which are adapted for insertion into slots formed in the ferrule. Such slots are spaced evenly about the circumference of the ferrule and are adapted to receive the tabs projecting from the shell. When the end of the shell adjacent the aperture is rolled inwardly, the tabs are inserted in the slots of the ferrule to attach the ferrule securely to the shell.

Since the shell is rolled around and into the ferrule, there is no need for an adhesive to hold these two structures together. Further, the interaction of the ferrule and the rolled shell obviates the need for a seal to prevent leakage between these two elements. Moreover, the slots are preferably located outwardly of the internal threads of the ferrule so that the O-ring of a conventional drain plug or sensor may be positioned to prevent leakage from occurring.

The internal rolling of the filter shell not only locks the ferrule into position without the use of a dedicated seal, but it also results in a central aperture which is circular so as to avoid problems associated with the hexagonal apertures of conventional designs. As a result, the central aperture of the drain/fill/sensor port does not suffer the cracking due to fatigue experienced by the hexagonal designs because the circular aperture does not weaken individual sections of the filter shell by creating corners or similar weak spots. Instead, the entire area of the shell surrounding the port is uniformly stressed by the fuel flow. Thus, the invention results in a fuel filter which is less susceptible to bursting than conventional filters.

The combination of these two qualities, high resistance to both leakage and bursting, results in a fuel filter with a substantially longer service life than that of conventional filters. Further, the present invention provides a fuel filter with improved operating characteristics in that it can withstand higher pressures than conventional filters. The improved operating characteristics and improved longevity of filters constructed in accordance with the present invention result in lower replacement and maintenance costs for those using such filters.

These and other features and advantages of the invention will be more readily apparent upon reading the following description of the preferred embodiment of the invention and upon reference to the accompanying drawings wherein:

DETAILED DESCRIPTION OF THE PREFERRED EMBODIMENT

Figure 1:
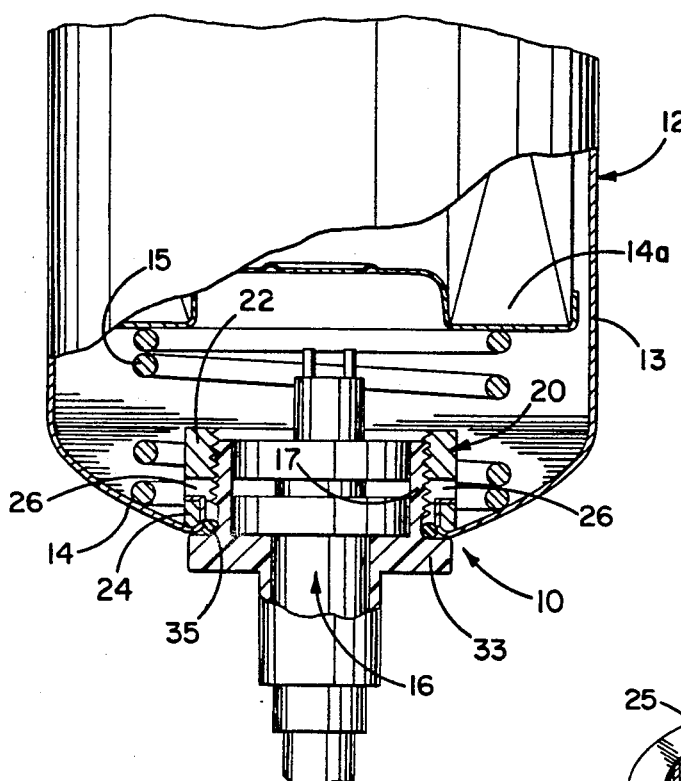
FIG. 1 is a partial cross-sectional view of a fuel filter employing a drain/fill/sensor port constructed in accordance with the teachings of the invention.

For purposes of illustration, the drain/fill/sensor port 10 of the invention has been shown in the drawings in conjunction with a fuel/water separator 12 of the type used with an internal combustion engine such as a diesel engine. The separator includes a closed sheet metal vessel or shell 13 which houses a filter element 14a that is held and located in the shell by a coil spring 15. During typical operation, fuel flows through the filter element while water and heavier molecular particles are separated therefrom and accumulate in a domed lower portion 14 of the shell.

The shell 12 must be drained periodically in order to remove the contaminants. In the present instance, draining is achieved by way of an internal valve (not shown) associated with a sensor 16 which detects various conditions within the separator 12. The sensor 16 is formed with a threaded neck 17 which is screwed into the port 10. It will be understood, however, that a threaded drain plug (not shown) could be used in place of the sensor.

In accordance with the present invention, a specially configured ferrule 20 coacts with a specially configured aperture 21 in the shell 12 to create a port 10 which is highly resistant to both leakage and bursting. This design minimizes the number of seals required to prevent leakage and enhances the strength of the shell 12. Moreover, as will be explained in detail below, the method of manufacturing the invention is simple, efficient and cost effective.

Figure 2:
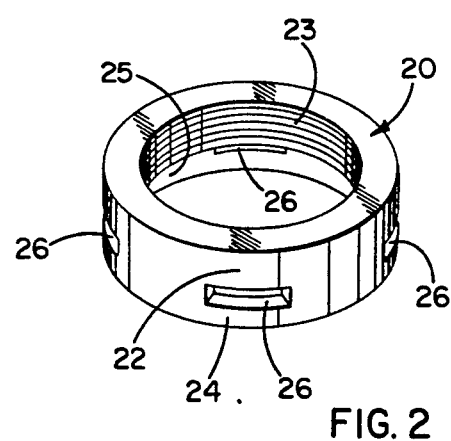
FIG. 2 is a perspective view of the ferrule.
Figure 3:
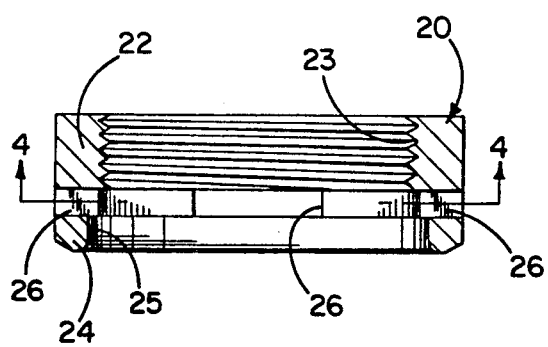
FIG. 3 is an enlarged cross-sectional view of the ferrule illustrated in FIG. 2.
Figure 4:
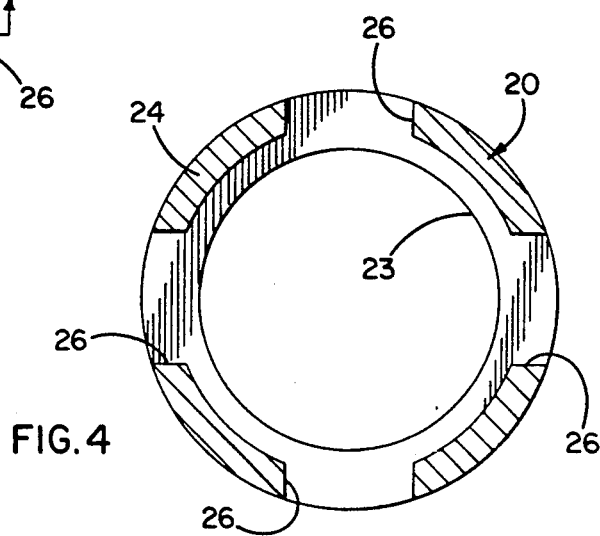
FIG. 4 is a cross-sectional view taken along the line 4—4 of FIG. 3.

As shown in FIG. 2, the ferrule 20 comprises a metal ring or body formed with an upper section 22 having an internal thread 23. The ferrule also includes a lower unthreaded section 24 defining an opening 25 whose diameter is somewhat larger than the diameter of the opening defined by the threaded portion 23. The threaded neck 17 of the sensor 16 is sized to screw into the threaded portion 23 of the ferrule 20.

In carrying out the invention, the ferrule 20 is formed with a plurality of angularly spaced slots 26, there herein being four equally spaced slots in the ferrule. The slots are generally arcuate in shape and extend completely through the lower section 24 of the ferrule immediately below the thread 23.

The slots 26 in the ferrule 20 coact with the domed end 14 of the shell 13 to lock the ferrule to the shell. For this purpose, the periphery of the central aperture in the domed end of the shell is defined in part by four angularly spaced pairs of tabs 28 (FIG. 5) adapted to fit into the slots, the angular dimension of each pair of tabs being just slightly less than the angular dimension of a slot 26.

Figure 5:
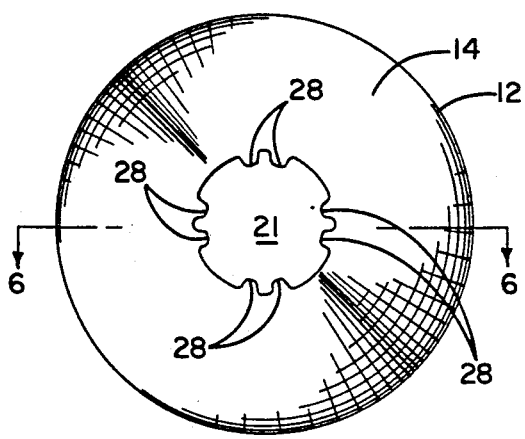
FIG. 5 is a bottom plan view of a filter shell illustrating the central aperture in an initially formed stage.
Figure 6:
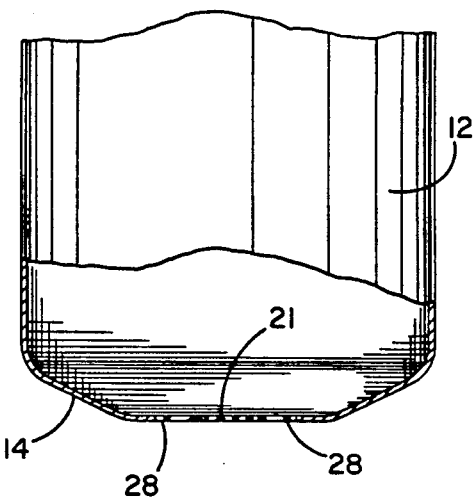
FIG. 6 is a partial cross-sectional view of the filter shell taken along the line 6—6 of FIG. 5.
Figure 7:
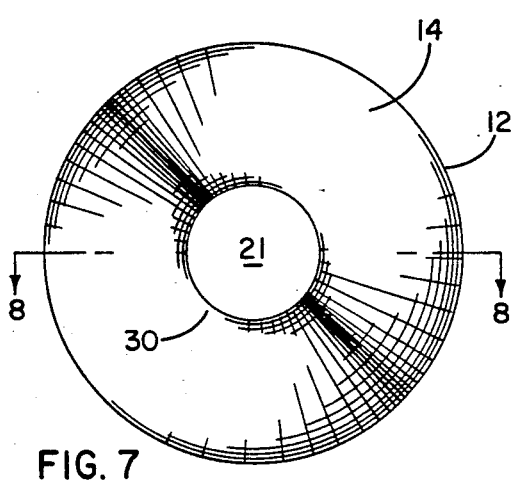
FIG. 7 is a bottom plan view similar to FIG. 5 but illustrates the central aperture of the filter shell in an intermediate stage.

The tabs 28 are formed in the domed end 14 of the shell 12 as an incident to punching the aperture 21 in the shell. As initially formed, the tabs extend radially inwardly from the edge of the aperture as shown in FIGS. 5 and 6. Thereafter, the tabs 28 are bent upwardly into the shell at right angles thereto (see FIG. 8) so that the periphery of the aperture 21 as viewed from the bottom of the shell becomes circular as illustrated in FIG. 7. The circumferential dimension around the outboard sides of the four pairs of tabs is just slightly smaller than the circumference of the opening 25 in the lower section 24 of the ferrule 20.

Figure 8:
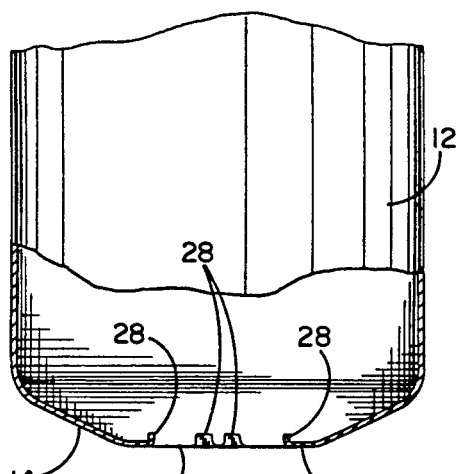
FIG. 8 is a partial cross-sectional view of the filter shell taken along the line 8—8 of FIG. 7; and, FIG. 9 is an enlarged fragmentary view showing the ferrule fully attached to the shell.
Figure 9:
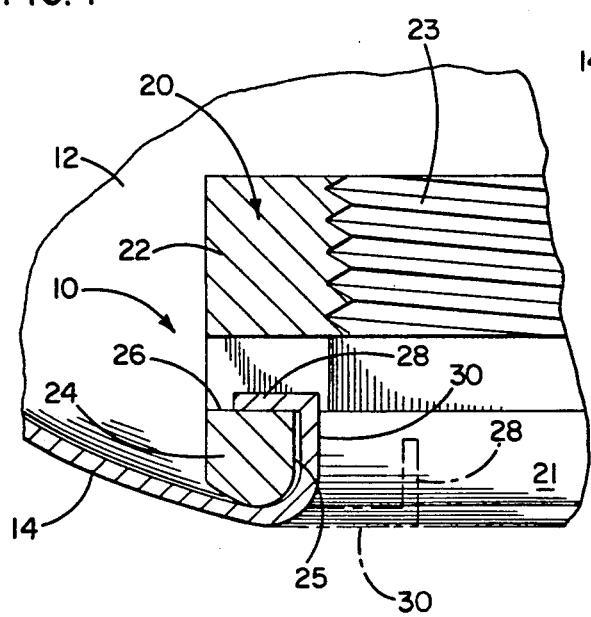

With the tabs 28 positioned as shown in FIG. 8, the ferrule 20 is inserted into the shell 12 from the upper open end thereof and is located with the opening 25 telescoped over the tabs. Thereafter, a circular strip 30 of material adjacent the aperture 21 is rolled upwardly through 90 degrees as shown in FIG. 9 and, as an incident thereto, the tabs 28 are rolled into the slots 26 and are crimped against the lower edges thereof. As a result, the lower section 24 of the ferrule 20 becomes clamped between the lower sides of the tabs and the upper side of the domed end 14 of the shell so as to captivate the ferrule axially in the shell. The side edges of the tabs 28 engage the ends of the slots 26 to restrict angular movement of the ferrule while the circular strip 30 defines a flange which coacts with the edge of the opening 25 to restrict radial movement of the ferrule. Accordingly, the ferrule is locked securely to the shell. Because the diameter of the opening 25 is greater than the diameter of the threaded opening 23, the flange 30 does not interfere with screwing the neck 17 of the sensor 16 into the opening 23.

Sealing of the port 10 is effected by a single O-ring 35 (FIG. 1) which is telescoped over the neck 17 of the sensor 16 and which becomes compressed between the lower region of the flange 30 and a radially outwardly extending flange 33 of the sensor when the sensor is threaded tightly into the ferrule 20. Thus, there is only a single leak region from the shell 12 and that region is tightly sealed by the O-ring 35.

It will be appreciated by those familiar with the art that the method of construction described above is simple, cost-effective and efficient. It avoids the need to employ an adhesive to install the port. Further, the method of the present invention results in a port which extends the service life of the filter 12. Filters constructed in accordance with the invention exhibit superior performance characteristics; having successfully withstood pressures of 300 psi before bursting and having been subjected to as many as 500,000 cycles in a pulse test before requiring replacement.

We claim:

1. A filter comprising a sheet metal shell having a filter element therein, said shell having an end with a central aperture extending therethrough, an interiorly threaded ferrule located adjacent said aperture and formed with a plurality of angularly spaced and radially inwardly opening slots, and a plurality of angularly spaced tabs formed integrally with said shell adjacent said aperture and extending radially outwardly into said slots to lock said ferrule to said shell.

2. A filter as defined in claim 1 in which said tabs engage surfaces of said slots to clamp said ferrule axially against said end of said shell and to restrict rotation of said ferrule relative to said shell.

3. A filter as defined in claim 2 in which said ferrule includes a central opening located radially inwardly of said slots, said aperture including an axially extending annular flange located within said opening to restrict movement of said ferrule radially of said shell.

4. A filter as defined in claim 3 in which said ferrule includes a threaded bore coaxially with and spaced axially from said central opening and having a diameter smaller than the diameter of said central opening and no larger than the inner diameter of said annular flange.

5. A filter as defined in claim 4 further including a threaded member screwed into said threaded bore, and an O-ring encircling said threaded member and compressed against said flange to seal said aperture.

* * * * *